United States Patent
Liu et al.

(10) Patent No.: US 8,253,045 B2
(45) Date of Patent: Aug. 28, 2012

(54) KEYPAD ASSEMBLY AND ELECTRONIC DEVICE USING SAME

(75) Inventors: Chung-Yu Liu, Taoyuan (TW); Wang-Hung Yeh, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 469 days.

(21) Appl. No.: 12/610,491

(22) Filed: Nov. 2, 2009

(65) Prior Publication Data

US 2010/0309026 A1    Dec. 9, 2010

(30) Foreign Application Priority Data

Jun. 9, 2009    (CN) .......................... 2009 1 0303099

(51) Int. Cl.
*H01H 9/26* (2006.01)

(52) U.S. Cl. ......... 200/5 A; 200/5 E; 200/292; 200/325; 341/22

(58) Field of Classification Search ............. 341/22–27; 200/5 A, 5 E, 292, 325, 512
See application file for complete search history.

(56) References Cited

U.S. PATENT DOCUMENTS

| 5,141,343 | A * | 8/1992 | Roylance et al. ............. 400/472 |
| 6,259,045 | B1 * | 7/2001 | Imai ............................... 200/5 A |
| 6,664,486 | B2 * | 12/2003 | Yoon et al. ..................... 200/5 A |
| 7,060,923 | B2 * | 6/2006 | Pihlaja .......................... 200/512 |
| 7,572,990 | B2 * | 8/2009 | Struve, Jr. ..................... 200/5 A |
| 7,626,133 | B2 * | 12/2009 | Wu et al. ....................... 200/341 |
| 7,989,716 | B2 * | 8/2011 | Yeh et al. ...................... 200/5 A |
| 8,124,894 | B2 * | 2/2012 | Yasui ............................. 200/5 A |
| 2002/0185360 | A1 * | 12/2002 | Yoon et al. ..................... 200/5 A |
| 2008/0149469 | A1 * | 6/2008 | Gaudet et al. ................. 200/5 A |
| 2010/0018848 | A1 * | 1/2010 | Cao ............................... 200/5 A |
| 2010/0025212 | A1 * | 2/2010 | Xu ................................. 200/341 |
| 2010/0175976 | A1 * | 7/2010 | Chen et al. .................... 200/5 A |

* cited by examiner

*Primary Examiner* — Linh Nguyen
(74) *Attorney, Agent, or Firm* — Altis Law Group, Inc.

(57) ABSTRACT

A keypad assembly is used for an electronic device. The keypad assembly includes a support member, a plurality of key strips and a plurality of elastic members. The support member defines a plurality of receiving grooves each with an angled bottom surface. The key strips are received in the receiving grooves. The elastic members are received in the receiving grooves, and each elastic member abuts a corresponding key strip providing a biasing force to extend a portion of the key strips from the receiving groove.

13 Claims, 5 Drawing Sheets

KEYPAD ASSEMBLY AND ELECTRONIC DEVICE USING SAME

CROSS-REFERENCE TO RELATED APPLICATIONS

This application is related to two co-pending U.S. patent applications (Ser. Nos. 12/610,497 and 12/610,494), both entitled "KEYPAD ASSEMBLY AND ELECTRONIC DEVICE USING SAME", by CHUNG-YU LIU et al. Such applications have the same assignee as the instant application and have been concurrently filed herewith. The disclosure of the above identified applications is incorporated herein by reference.

BACKGROUND

1. Technical Field

The present disclosure relates to keypad assemblies and, particularly, to a keypad assembly used in an electronic device.

2. Description of Related Art

With the development of wireless communication and information processing technologies, portable electronic devices, such as mobile telephones and personal digital assistants, are now widely used. These electronic devices typically have a keypad assembly as an input terminal.

Keypad assemblies used in portable electronic devices are becoming smaller and thinner. A conventional keypad assembly includes a plurality of keys. The keys are positioned coplanar with each other, and are arranged very close together. Accidental keystrokes are common and easily made. Additionally, use of the keypad can be uncomfortable.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present keypad assembly. Moreover, in the drawings, like reference numerals designate corresponding parts throughout the several views, in which.

DETAILED DESCRIPTION

Figure 1:
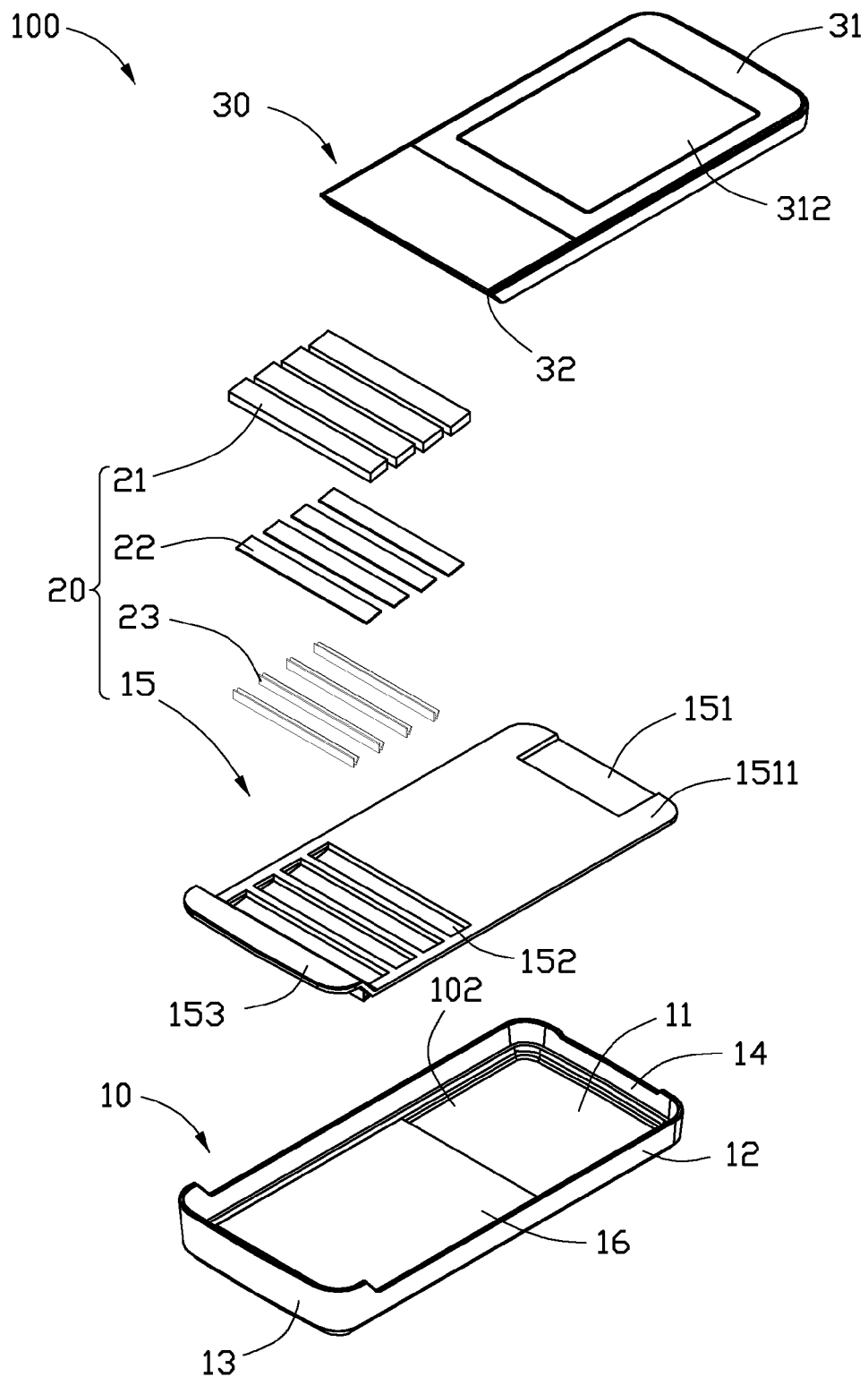
FIG. 1 is an exploded, isometric view of an exemplary keypad assembly used in an electronic device.

FIG. 1 is an exploded, isometric view of an exemplary keypad assembly 20 used in an electronic device 100, such as a slidable mobile phone.

The electronic device 100 includes a housing body 10 and a cover member 30. The housing body 10 includes a bottom portion 11, two sidewalls 12, a first end wall 13 and a second end wall 14, cooperatively defining a cavity 102. The first end wall 13 is higher than the second end wall 14. A printed circuit board 16 is received in the cavity 102, and positioned in the bottom portion 11. The cover member 30 is slidably attached to the housing body 10 by a slide mechanism (not shown).

The cover member 30 includes a panel 31 and an end portion 32. A display 312 is secured to the panel 31.

The keypad assembly 20 includes a support member 15, four key strips 21, four touch panels 22, and four elastic members 23.

Figure 2:
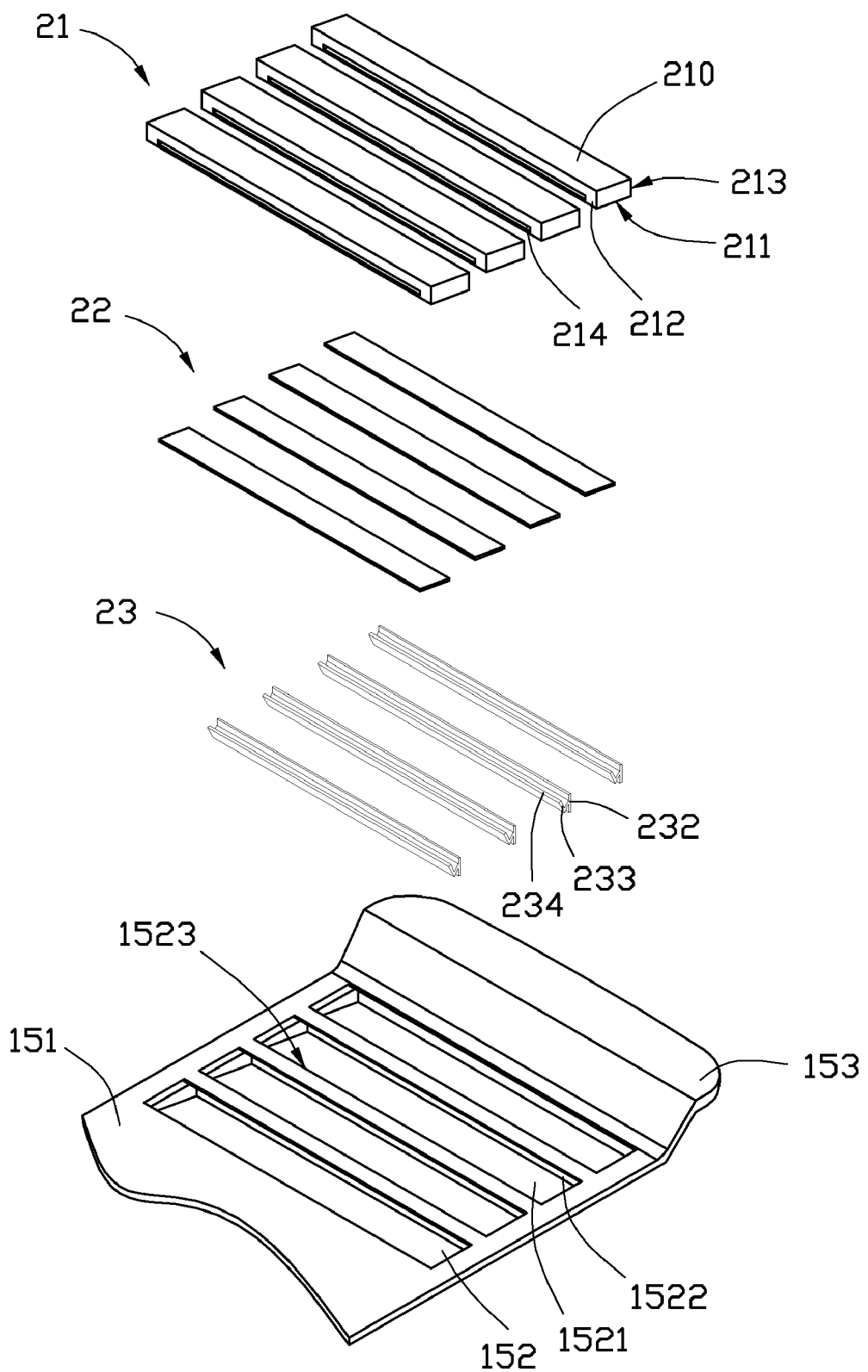
FIG. 2 is an enlarged view of the keypad assembly shown in FIG. 1.

The support member 15 corresponds in size to the housing body 10, and may be supported by the sidewalls 12 and end walls 13, 14 of the housing body 10 and cover the cavity 102. The support member 15 includes a main body 151 and an extending portion 153 formed at one end of the main body 151. The main body 151 includes an upper surface 1511 and defines four receiving grooves 152 adjacent to the extending portion 153. The receiving grooves 152 are parallel. The extending portion 153 first extends at an angle and then parallel to the main body 10. The angled portion of the extending portion 153 subtends an obtuse angle with the main body 151. Referring to FIG. 2, each receiving groove 152 is defined by a bottom surface 1521 and side surfaces 1522, 1523. The bottom surface 1521 is angled relative to the main body 151, making side surface 1522 taller than side surface 1523.

Each key strip 21, engagable in one of the receiving grooves 152, includes a contact surface 210, a back surface 211, a first side surface 212 and a second side surface 213. The first side surface 212 defines a slot 214. Each touch panel 22 is received in one of the slots 214, and is electrically connected to the printed circuited board 16. Each key strip 21 may be divided into three or four key areas corresponding to e.g. different groups of numbers or words.

Each elastic member 23 can be made of plastic and has a length equal to the length of a corresponding key strip 21. Each elastic member 23 includes a resisting plate 232 integrally formed with an arm plate 233 Each arm plate 233 is substantially V-shaped, and one end of each arm plate 233 extends from a middle portion of the resisting plate 232. The arm plate 233 is deformable, and has a distal end 234 abutting a given key strip 21.

Figure 3:
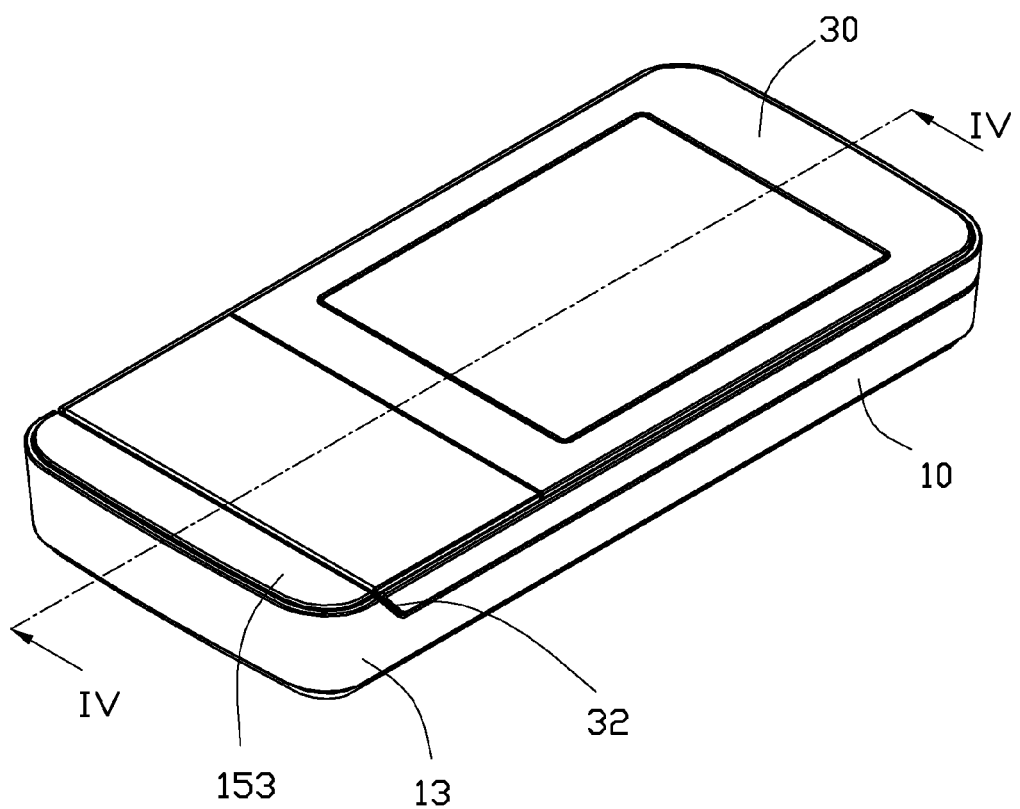
FIG. 3 is an assembled, isometric view of an exemplary electronic device utilizing the keypad assembly of FIG. 1.
Figure 4:
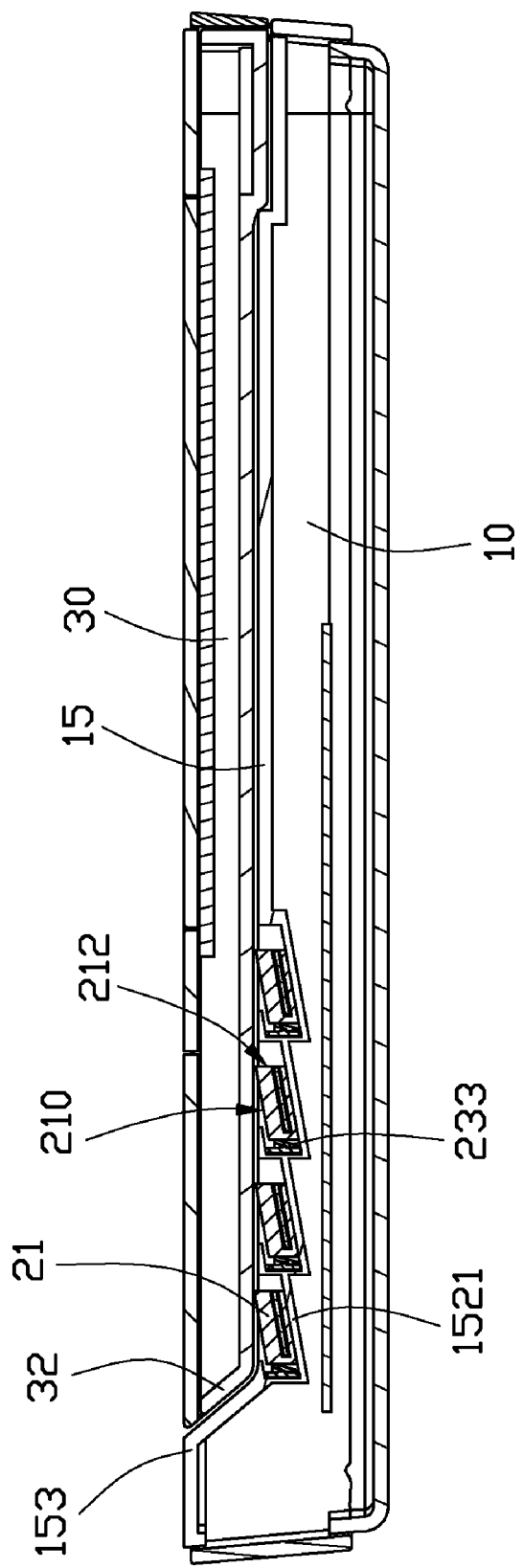
FIG. 4 is a cross section of the keypad assembly shown in FIG. 3 taken along line IV-IV.

In FIGS. 3 and 4, when the keypad assembly 20 is secured to the housing body 10, each elastic member 23 is received in one of the receiving grooves 152. The resisting plate 232 is fixed to the side surface 1522, and the arm plate 233 extends toward the side surface 1523. Each touch panel 22 is positioned in a corresponding slot 214 of each key strip 21. Then, each key 21 with the touch panel 22 is assembled into the receiving groove 152 of the support plate 15. The distal end 234 of the arm plate 233 abuts an edge of the key strip 21. In this exemplary embodiment, the distal end 234 is fixed to the edge of the key strip 21. The elastic members 23 provide elastic force biasing key strip 21 when it slides along the bottom surface 1521 in the receiving groove 152. Since the bottom surface 1521 is angled relative to the main body 151, the key strip 21 is also angled in the receiving groove 152, and one end of each key strip 21 protrudes from its corresponding receiving groove 152.

The support plate 15 with the key strips 21, the touch panels 22 and elastic members 23 is secured to the housing body 10. The extending portion 153 abuts the first end wall 13 of the housing body 10. The cover member 30 is slidably attached to the housing body 10. As the cover member 30 is slid towards the closed position, the end portion 32 forces the key strips 21 downward toward the elastic members 23 to bend the arm plates 233 until the key strips 21 are completely received in their receiving groove 152. The cover member 30 is then closed relative to the housing body 10.

Figure 5:
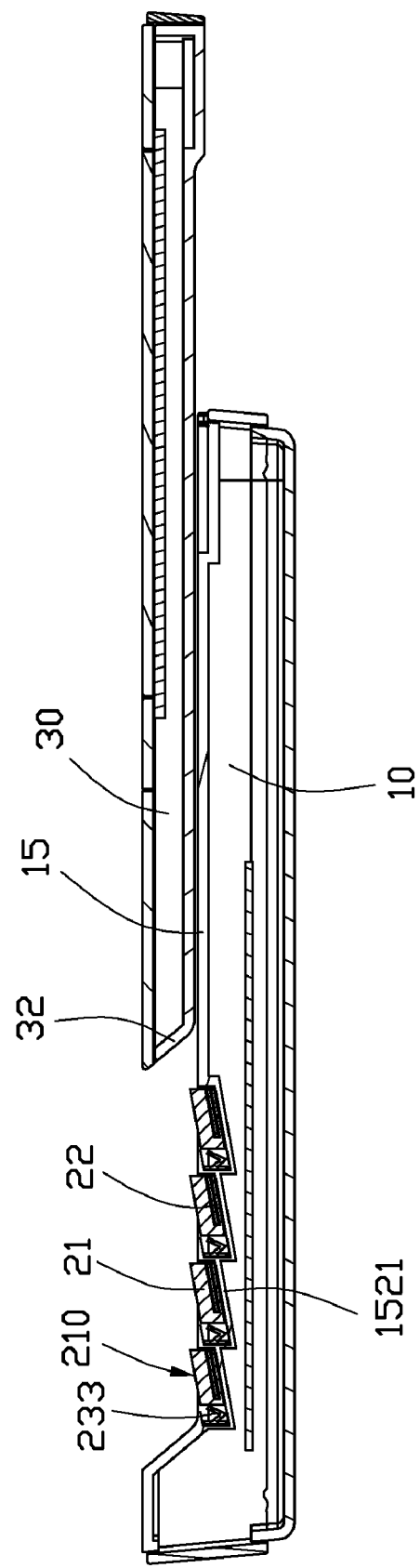
FIG. 5 is similar to FIG. 4, but in an open position.

Referring to FIG. 5, when the cover is slid towards the open position, the cover member 30 moves relative to the housing body 10 to expose the keypad assembly 20. The arm plates 233 resume their original state by elastic force to impel one portion of the key strips 21 to protrude from its corresponding groove 152. Thus, the key strips 21 are easily operated comfortably and accurately for keystrokes with no increase in size or weight of the electronic device.

It is understood that the arm plate 233 of the elastic member 23 may adopt varying shapes.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad assembly for an electronic device, the keypad assembly comprising:
   a support member defining a plurality of receiving grooves with an angled bottom surface;
   a plurality of key strips received in the receiving grooves; and
   a plurality of elastic members received in the receiving grooves, each elastic member abutting a corresponding key strip and providing a biasing force to extend a portion of the key strips from their receiving grooves.

2. The keypad assembly as claimed in claim 1, wherein each elastic member includes a resisting plate integrally formed with a deformable arm plate; and each arm plate is V-shaped.

3. The keypad assembly as claimed in claim 2, wherein one end of each arm plate extends from a middle portion of the resisting plate.

4. The keypad assembly as claimed in claim 1, wherein each key strip defines a slot in which a touch panel is correspondingly received.

5. The keypad assembly as claimed in claim 1, wherein the support member includes a main body and an extending portion formed at one end of the main body, adjacent to where the main body defines the receiving grooves.

6. The keypad assembly as claimed in claim 5, wherein the receiving grooves are parallel to each other.

7. The keypad assembly as claimed in claim 5, wherein the extending portion first extends at an angle, and then parallel to the main body; the angled portion of the extending portion forming an obtuse angle with the main body.

8. The keypad assembly as claimed in claim 1, wherein each receiving groove is defined by the bottom surface and two side surfaces, wherein a height of one of the side surfaces is greater than the height of the other side surface.

9. An electronic device, comprising:
   a housing body defining a plurality of receiving grooves, each receiving groove having angled bottom surfaces;
   a plurality of key strips, each key strip received in one of the receiving grooves and positioned on the receiving groove's bottom surface; and
   a plurality of elastic members, each elastic member received in one of the receiving grooves, each elastic member abutting a corresponding edge of one of the key strips;
   a cover member slidably attached to the housing body for covering the key strips, wherein when the cover member is slid in the opening direction, the elastic members provide forces to extend a portion of their respective key strips from their respective receiving grooves.

10. The electronic device as claimed in claim 9, further comprising a support member, wherein the support member includes a main body and an extending portion formed at one end of the main body, and the main body defines the receiving grooves adjacent to the extending portion.

11. The electronic device as claimed in claim 10, wherein the extending portion first extends at an angle, and then parallel to the main body; the angled portion of the extending portion forming an obtuse angle with the main body.

12. The electronic device as claimed in claim 9, wherein each elastic member includes a resisting plate integrally formed with a deformable arm plate, and each arm plate is V-shaped.

13. The electronic device as claimed in claim 12, wherein one end of each arm plate extends from a middle portion of the resisting plate.

* * * * *